(12) United States Patent
Forbes et al.

(10) Patent No.: US 7,028,194 B2
(45) Date of Patent: Apr. 11, 2006

(54) METHOD AND APPARATUS FOR ACTIVATING A BLEED CIRCUIT THROUGH LOGIC IN RESPONSE TO A BACK-DRIVEN VOLTAGE ON A SUPPLY VOLTAGE PLANE

(75) Inventors: Brian S. Forbes, Portland, OR (US); Erik W. Peter, Hillsboro, OR (US); Jeffrey J. Berube, Portland, OR (US); Charles M. Bailley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 600 days.

(21) Appl. No.: 09/876,277

(22) Filed: Jun. 7, 2001

(65) Prior Publication Data

US 2002/0188876 A1 Dec. 12, 2002

(51) Int. Cl.
*G06F 1/30* (2006.01)
*G05F 1/40* (2006.01)
(52) U.S. Cl. ....................... 713/300; 323/282
(58) Field of Classification Search .......... 713/300, 713/320; 323/282
See application file for complete search history.

(56) References Cited

U.S. PATENT DOCUMENTS 5,811,962 A * 9/1998 Ceccherelli et al. ........ 323/282
5,842,027 A * 11/1998 Oprescu et al. ............. 713/300
5,900,768 A * 5/1999 Price ........................... 327/427
6,266,776 B1 * 7/2001 Sakai .......................... 713/300
6,278,598 B1 * 8/2001 Suzuki et al. ............... 361/93.9
6,675,304 B1 * 1/2004 Pole et al. ................... 713/322

FOREIGN PATENT DOCUMENTS

JP 04245867 A * 9/1992
JP 10065508 A * 3/1998

OTHER PUBLICATIONS

Campbell Art, #2308 Intro to Ohm's Law, 2004, http://www.teachers.net/lessones/posts/2308.html.*

* cited by examiner

*Primary Examiner*—Thomas Lee
*Assistant Examiner*—Mark Connolly
(74) *Attorney, Agent, or Firm*—Trop, Pruner & Hu, P.C.

(57) ABSTRACT

A technique usable with a computer includes in response to the computer being in a predetermined sleep state, coupling a load to conduct current from a supply voltage plane of the computer to ground. The supply voltage plane does not receive power from a power resource of the computer in response to the predetermined sleep state. In response to the computer being in a predetermined state other than the predetermined sleep state, the load is decoupled so that the load does not conduct current from the supply voltage plane to ground.

19 Claims, 3 Drawing Sheets

| ACPI SLEEP STATE | BACKFEED_CUT POLARITY | N-CHANNEL STATUS |
|---|---|---|
| S0 | 0 | OFF |
| S1 | 0 | OFF |
| S3 | 1 | ON |
| S4 | 1 | ON |
| S5 | 1 | ON |

FIG. 4

METHOD AND APPARATUS FOR ACTIVATING A BLEED CIRCUIT THROUGH LOGIC IN RESPONSE TO A BACK-DRIVEN VOLTAGE ON A SUPPLY VOLTAGE PLANE

BACKGROUND

The invention generally relates to controlling a supply voltage during a sleep state.

In a device, such as a computer, that may be operated from a battery, it is important to reduce the power consumption to the greatest possible extent. The usefulness of a battery-operated device is reduced if the battery must be recharged frequently. It may also be desirable to reduce the power consumption of an AC wall voltage-powered device (a desktop computer, for example). A variety of techniques are known for reducing the dynamic power consumption. For example, the Advanced Configuration and Power Interface (ACPI) Specification (Rev. 2.0, Jul. 27, 2000) sets forth information about how to reduce the dynamic power consumption of portable and other computers.

The ACPI Specification defines six sleep states (S0–S5) for the computer. The S0 state is highest power state for the computer, the S1 state is the next highest power state, the S2 state is the next highest power state, etc. In state S0, the computer is fully powered on. In state S1, the computer is in a standby state in which processors of the computer do not execute instructions and some power resources in the computer are turned off. In the sleep states S2–S5, progressively less power is consumed during each sleep state. In the lowest power sleep states (S3–S5), a problem associated with incorrect voltages on the computer's supply planes may arise.

In this manner, in the lowest power sleep states, power resources (voltage regulators that furnish DC supply voltages, for example) of the computer are removed, or disconnected, from various supply voltage planes of the computer. However, powered peripherals that are connected to the computer and are electrically coupled to these supply voltage planes may be fully powered on when the computer enters the lowest power sleep states. As a result, a particular powered peripheral may produce a "back-driven voltage" on an otherwise unpowered supply voltage plane. This back-driven voltage, in turn, may cause components of the computer that are electrically coupled to receive power from the supply voltage plane to receive an incorrect supply voltage level and thus, may cause these components to malfunction. For example, in response to an incorrect supply voltage level, a particular component may internally generate incorrect logic levels that prevent the component from exiting a particular sleep state.

Thus, there is a continuing need for a technique and/or arrangement to address one or more of the problems that are stated above.

BRIEF DESCRIPTION OF THE DRAWING

FIG. 4 is a table illustrating operation of the circuitry of FIG. 2 according to an embodiment of the invention.

DETAILED DESCRIPTION

Figure 1:
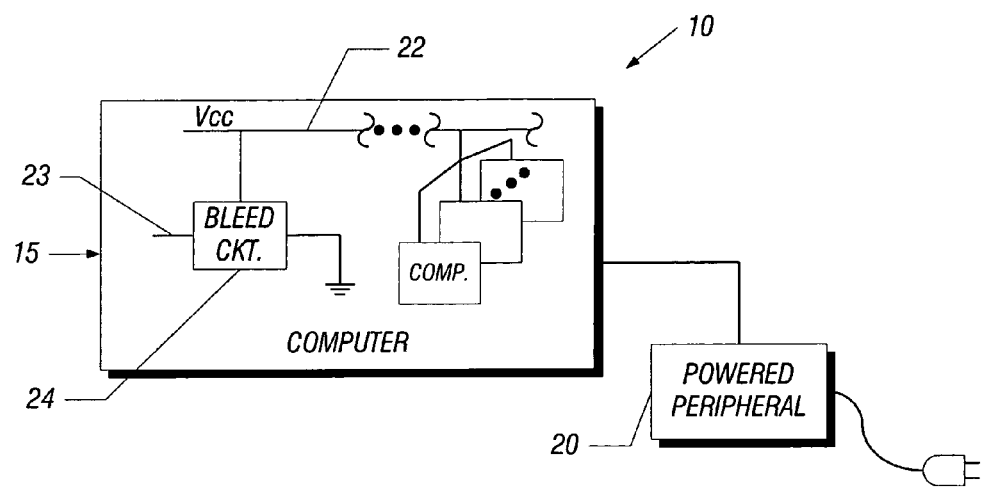
FIG. 1 is a schematic diagram of a computer system according to an embodiment of the invention.

Referring to FIG. 1, an embodiment of a computer system 10 in accordance with the invention includes a computer 15 that implements a technique to reduce the dynamic power consumption of the computer 15. For example, the computer 15 may use a technique in accordance with the ACPI standard. Pursuant to this technique, the computer 15 may enter sleep states in which voltage supply planes (such as the voltage supply plane labeled "$V_{CC}$" in FIG. 1) of the computer 15 are susceptible to back-driven voltages that are produced by external powered peripherals 20 (of the computer system 10) that are electrically coupled to one or more of these supply voltage planes.

As an example, a particular powered peripheral 20 may be a printer that is powered via an AC wall outlet. The printer may be connected to the computer 15 via a parallel cable to a parallel port of the computer 15. This parallel port includes one or more pins that are electrically coupled to the supply voltage plane. Thus, it is possible that, as described below, during certain conditions, the printer may produce a back-driven voltage on one or more supply voltage planes of the computer 15.

For purposes of controlling the levels of back-driven voltages, the computer 15 includes one or more current bleed circuits 24, each of which is coupled between an associated supply voltage plane of the computer 15 and ground. For the example depicted in FIG. 1, the bleed circuit 24 is coupled between the $V_{CC}$ supply voltage plane and ground.

During some of the sleep states, the power resources (voltage regulators that DC supply voltages for example) of the computer 15 may be disconnected from the supply voltage planes. Thus, during these sleep states, these supply voltage planes ideally do not supply power to components 27 (of the computer 15) that are coupled to the supply voltage planes. However, because these supply voltage planes are not coupled to power resources of the computer 15 during these sleep states, the voltage levels of the supply voltage planes are susceptible to being set to incorrect levels by powered peripherals 20 that are connected to the computer 15.

To minimize the back-driven voltage levels that may appear on these supply voltage planes, the computer 15 activates its bleed circuits 24, such as the bleed circuit 24 depicted in FIG. 1, during selected low power sleep states. When activated, each bleed circuit 24 establishes a low resistance current path from its associated supply voltage plane to ground to draw current from the supply voltage plane. This current path, in turn, establishes a low voltage level for the supply voltage plane during the selected sleep states to prevent a large back-driven voltage and to keep logic of the computer's components 27 from malfunctioning. During the higher power sleep states, the bleed circuits 24 remain inactive and do not draw current or dissipate power, thereby maintaining the power efficiency of the computer 15 during these states.

Figure 2:
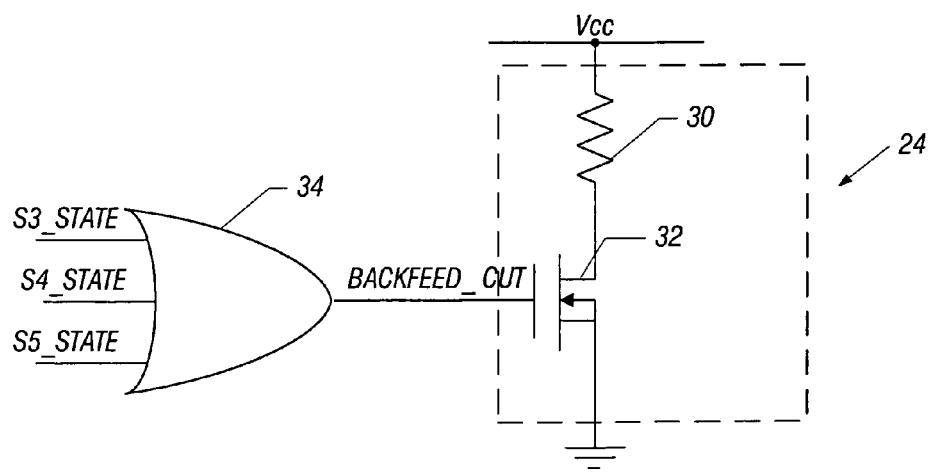
FIG. 2 is a schematic diagram of circuitry to control a back-driven voltage according to an embodiment of the invention.

More specifically, in some embodiments of the invention, the bleed circuit 24 may have a design similar to that shown in FIG. 2. In this design, the bleed circuit 24 includes a resistor 30 that is selectively coupled between the supply voltage plane (such as the $V_{CC}$ supply voltage plane that is depicted in FIG. 2) and ground during selected lower power sleep states by a switch, such as an n-channel metal-oxide-semiconductor field-effect-transistor (NMOSFET) 32. In this manner, one terminal of the resistor 30 is coupled to the supply voltage plane, and another terminal of the resistor 30 is coupled to the drain terminal of the NMOSFET 32. The source terminal of the NMOSFET 32 is coupled to ground, and the gate terminal of the NMOSFET 32 receives a signal called Backfeed_Cut.

In response to the computer 15 entering selected lower power sleep states, the Backfeed_Cut signal is asserted (driven high, for example) to activate the bleed circuit 24. When the bleed circuit 24 is activated, the NMOSFET 32 saturates to form a low resistance current path (that includes the resistor 32 and the drain-source path of the NMOSFET 32) between the supply voltage plane and ground. When the Backfeed_Cut signal is deasserted (driven low, for example) when the computer 15 is in the non-selected higher power sleep states, the drain-source path of the NMOSFET 32 does not conduct to remove the current path to ground.

In some embodiments of the invention, the resistor 30 may be between one and ten ohms, such as five ohms, to keep the voltage level of the supply voltage plane sufficiently low (near ground) to minimize the back-driven voltage levels (voltages less than or equal to three volts, as an example) that would otherwise appear on the supply voltage plane without the use of the bleed circuit 24. As a more specific example, in some embodiments of the invention, the resistor 30 may source approximately 100 mA/V to ground.

In some embodiments of the invention, the computer 15 may use a technique in accordance with the ACPI standard to reduce dynamic power consumption. In these embodiments, the computer 15 may implement six sleep states (S0, S1, S2, S3, S4 and S5). As an example, the bleed circuit 24 may be activated during the lowest power ACPI states, such as states S3, S4 and S5, in which back-driven voltages from powered peripherals become a greater problem. Continuing this example, the bleed circuit 24 may be deactivated during the higher power sleep states (states S0–S2).

As an example of an embodiment of the invention, the logic levels of the Backfeed_Cut signal and the conduction states of the NMOSFET 32 for the S0–S5 sleep states are depicted in a table 100 in FIG. 4. As shown, the Backfeed_Cut signal has a logic one level (a level that turns on the NMOSFET 32) for the S3–S5 sleep states, and the Backfeed_Cut signal has a logic zero level (a level that turns off the NMOSFET 32) for the other sleep states.

Referring back to FIG. 2, for the scenario described above in which the bleed circuit 24 is activated during the S3–S5 states, the computer 15 may include an OR gate 34 to generate the Backfeed_Cut signal at the output terminal of the OR gate 34. Not shown in FIG. 2 is a driver that may be coupled between the NMOSFET 32 and the output terminal of the OR gate 34. The OR gate 34 receives three signals at its three input terminals: a signal (called S3_STATE) that indicates (via a high logic level, for example) when the computer 15 is in the S3 sleep state; a signal (called S4_STATE) that indicates (via a high logic level, for example) when the computer 15 is in the S4 sleep state; and a signal (called S5_STATE) that indicates (via a high logic level, for example) when the computer 15 is in the S5 sleep state. The generation of the S3_STATE, S4_STATE and S5_STATE signals may be controlled by wake-up/sleep logic (not shown) of the computer 15.

Figure 3:
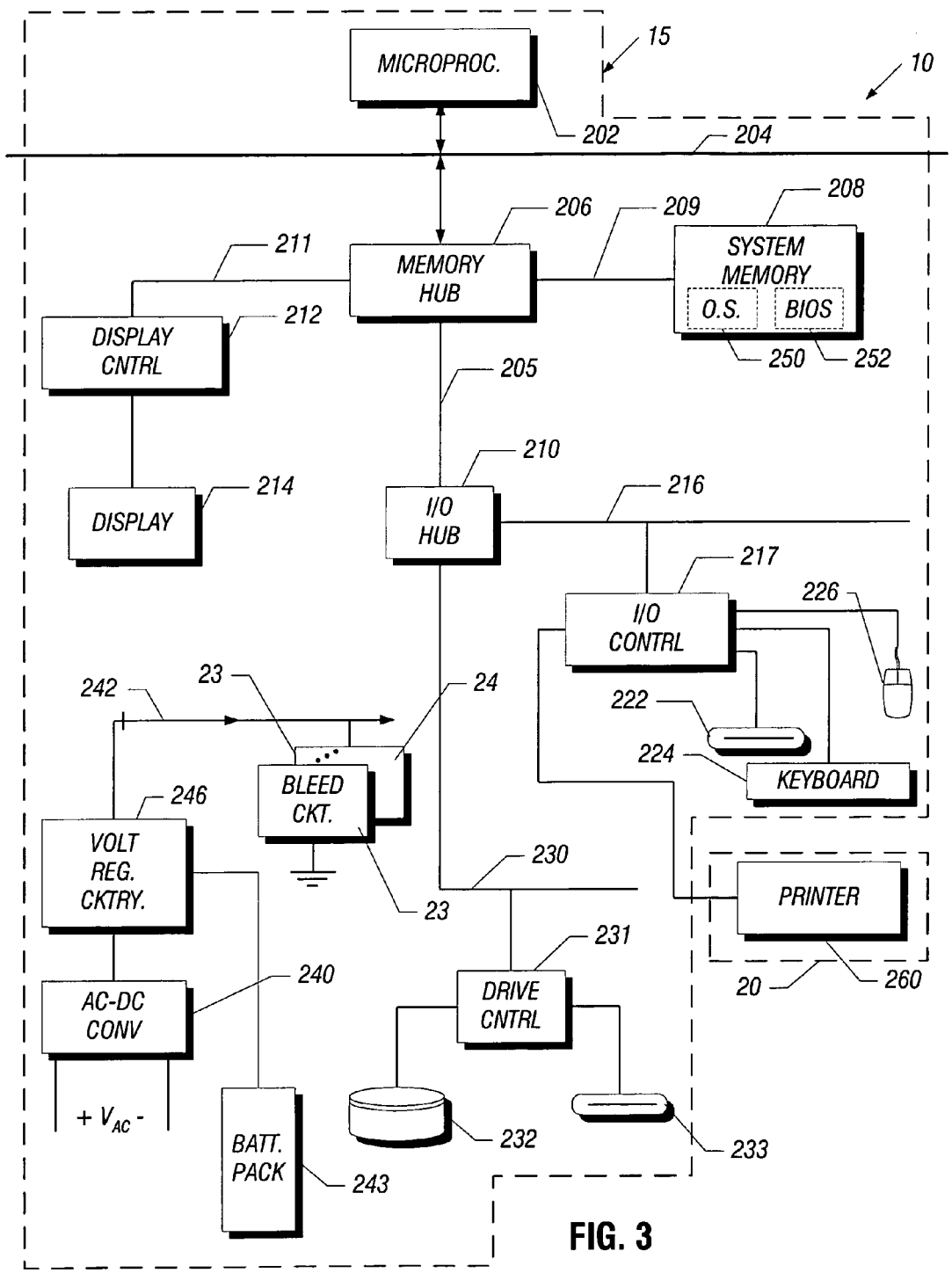
FIG. 3 is a more detailed schematic diagram of the computer system of FIG. 1 according to an embodiment of the invention.

Referring to FIG. 3, in some embodiments of the invention, the powered peripheral device 20 may be a device, such as a printer 260, that plugs into a parallel port of the computer 15. Other and different powered peripheral devices 20 may be plugged into the computer 15 and may be capable of producing back-driven voltages on the supply voltage planes of the computer 15.

The computer 15 may include power resources, such as voltage regulation circuitry 246, that furnish internally regulated power to supply voltage planes 242 of the computer 15. As examples, the supply voltage planes 242 may furnish different voltage levels, such as 5 V, 3.3 V, 2.5 V, 1.8 V and 1.5V voltage levels. One or more of these supply voltage planes 242 may be electrically coupled to the external powered peripheral 20. As an example, one of these supply voltage planes 242 may be the $V_{CC}$ supply voltage plane depicted in FIGS. 1 and 2.

In some of the sleep states, voltage regulation circuitry, such as the circuitry 246, of the computer 15 may be selectively isolated from the supply voltage planes 242. It is possible that some of the power resources are disconnected from some supply voltage planes 242 in one sleep state, and other power resources are not disconnected from their associated supply voltage planes 242 until lower power sleep states. As depicted in FIG. 3, to prevent back-driven voltages on its supply voltage planes 242, the computer 15 may include multiple bleed circuits 24, each of which is coupled between one of the planes 242 and ground.

In addition to the voltage regulation circuitry 246, the computer 15 may also include an AC-to-DC converter 240 that may receive an AC wall voltage and convert the AC voltage into a DC voltage that is provided to the voltage regulation circuitry 246. The voltage regulation circuitry 246 may also receive a DC voltage from a battery pack 243 that furnishes power when AC power is unavailable.

Among the components of the computer 15 that consume power from and are coupled to the supply voltage planes 242, the computer 15 may include a microprocessor 202 and a bridge circuit, or memory hub 206, both of which are coupled to a local bus 204. The memory hub 206 may interface the local bus 204, a memory bus 209 and an Accelerated Graphics Port (AGP) bus 211 together. The AGP is described in detail in the Accelerated Graphics Port Interface Specification, Revision 1.0, published on Jul. 31, 1996, by Intel Corporation of Santa Clara, Calif. A system memory 208 may be coupled to the memory bus 209, and a display controller 212 (that controls a display 214) may be coupled to the AGP bus 211. The system memory 208 may store, for example, instructions 250 relating to the Operating System (O.S.) control of the dynamic power reduction technique (an ACPI-compliant technique, for example) as well as instructions 252 relating to the basic input/output system (BIOS) control of the dynamic power reduction technique. In this manner, the microprocessor 202 may execute the O.S. to determine when to do power management, and execute the BIOS to determine how to do the power management.

Among the other features of the computer system 10, a hub communication link 205 may couple the memory hub 206 to another bridge circuit, or input/output (I/O) hub 210. The I/O hub 210 includes interfaces to an input/output (I/O) expansion bus 216 and a Peripheral Component Interconnect (PCI) bus 230. The PCI Specification is available from the PCI Special Interest Group, Portland, Oreg. 97214. An I/O controller 217 may be coupled to the ISA bus 216 and receive input data from a keyboard 224 and a mouse 226, as examples. The I/O controller 217 may also control operations of a floppy disk drive 222. The I/O controller 217 may also provide an interface(s), for example, for communicating with one or more powered peripheral devices 20. A drive controller 231 may be coupled to the PCI bus 230. The drive controller 231 may control operations of a hard disk drive 232 and a CD-ROM drive 233, as examples.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a computer, comprising:
   in response to the computer being in a first predetermined sleep state in which the computer remains powered up, providing a logic signal to activate a bleed circuit so that the bleed circuit conducts a current from a supply voltage plane in response to a back-driven voltage on the supply voltage plane to restrict a magnitude of the voltage; and
   in response to the computer being in a second state other than the first predetermined sleep state, removing the logic signal to de-activate the bleed circuit.

2. The method of claim 1, wherein the second state comprises a higher power state than the first predetermined sleep state.

3. The method of claim 1, wherein the second state comprises another sleep state.

4. The method of claim 1, wherein the first predetermined sleep state comprises a state within a range of predetermined sleep states.

5. The method of claim 4, wherein the range of predetermined sleep states comprises the lowest power sleep states of the computer.

6. The method of claim 1, wherein the back-driven voltage is produced by a powered peripheral coupled to the computer.

7. The method of claim 1, wherein the bleed circuit comprises a transistor having a current controlled path coupled to the supply voltage plane and a terminal to control the path in response to the logic signal.

8. An apparatus comprising:
   a bleed circuit coupled to a supply voltage plane; and
   logic to activate the bleed circuit in response to a predetermined sleep state of a computer so that the bleed circuit conducts a current from the supply voltage plane in response to a back-driven voltage on the supply voltage plane to restrict a magnitude of the voltage.

9. The apparatus of claim 8, wherein the bleed circuit comprises a transistor having a current controlled path coupled to the supply voltage plane and a terminal to control the path in response to the logic signal.

10. The apparatus of claim 8 wherein the logic de-activates the bleed circuit in response to a state of the computer other than said predetermined sleep state.

11. The apparatus of claim 10, wherein said state of the computer other than said predetermined sleep state comprises a higher power state than said predetermined sleep state.

12. The apparatus of claim 8, wherein the logic activates the bleed circuit in response to the predetermined sleep state being one of a plurality of sleep states in which the computer remains turned on.

13. The apparatus of claim 8, wherein the back-driven voltage comprises a voltage generated by a powered peripheral coupled to the computer.

14. A computer system comprising:
    a supply voltage plane;
    a voltage regulator coupled to the supply voltage plane to not provide power to the supply voltage plane during a predetermined sleep state of the computer system in which the computer system remains turned on and provide power to the supply voltage plane during a second state other than the first predetermined sleep state;
    a bleed circuit coupled to the supply voltage plane; and
    logic to activate the bleed circuit in response to the first predetermined sleep state so that the bleed circuit conducts a current from the supply voltage plane in response to a back-driven voltage on the supply voltage plane to restrict a magnitude of the voltage.

15. The apparatus of claim 14, wherein the bleed circuit comprises a transistor having a current controlled path coupled to the supply voltage plane and a terminal to control the path in response to the logic signal.

16. The apparatus of claim 14, wherein the logic de-activates the bleed circuit in response to the second state.

17. The apparatus of claim 14, wherein the second state comprises a higher power state than the first predetermined sleep state.

18. The apparatus of claim 14, wherein the logic activates the bleed circuit in response to the first predetermined sleep state being one of a plurality of sleep states in which the computer remains turned on.

19. The apparatus of claim 14, wherein the back-driven voltage comprises a voltage generated by a powered peripheral coupled to the computer.

* * * * *